Dec. 10, 1940.  R. W. CANFIELD  2,224,759
SUCTION CUP GLASS FEEDING MECHANISM AND METHOD
Filed Sept. 12, 1936  2 Sheets-Sheet 1
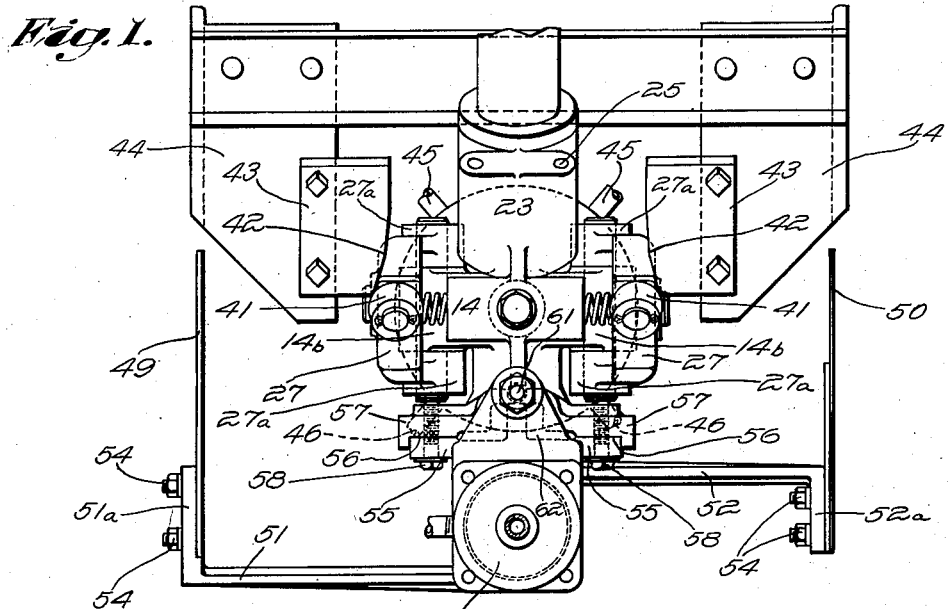
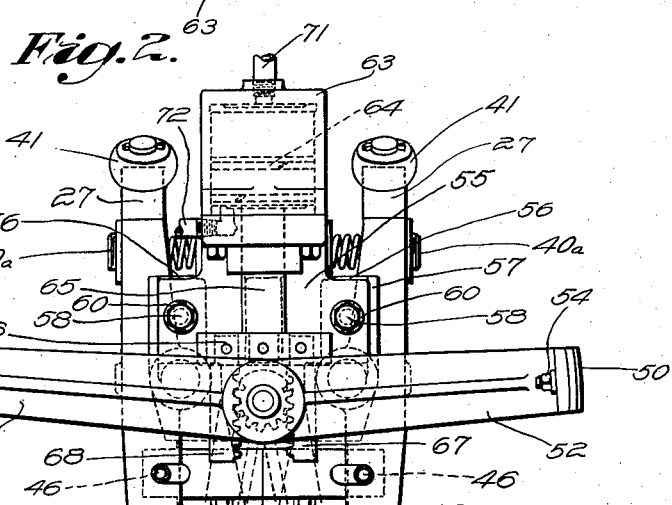
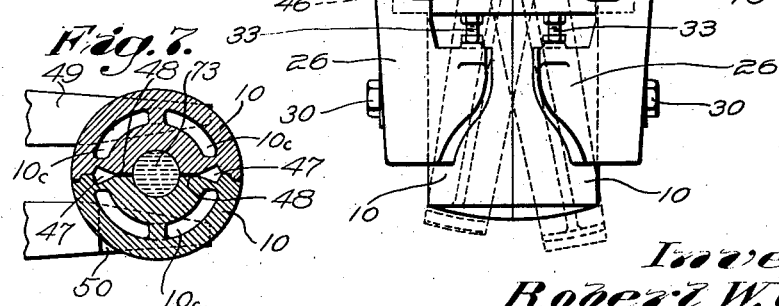
Inventor:
Robert W. Canfield
by Brown & Parham
Attorneys
Witness:
W. B. Thayer.

Dec. 10, 1940. R. W. CANFIELD 2,224,759
SUCTION CUP GLASS FEEDING MECHANISM AND METHOD
Filed Sept. 12, 1936 2 Sheets-Sheet 2
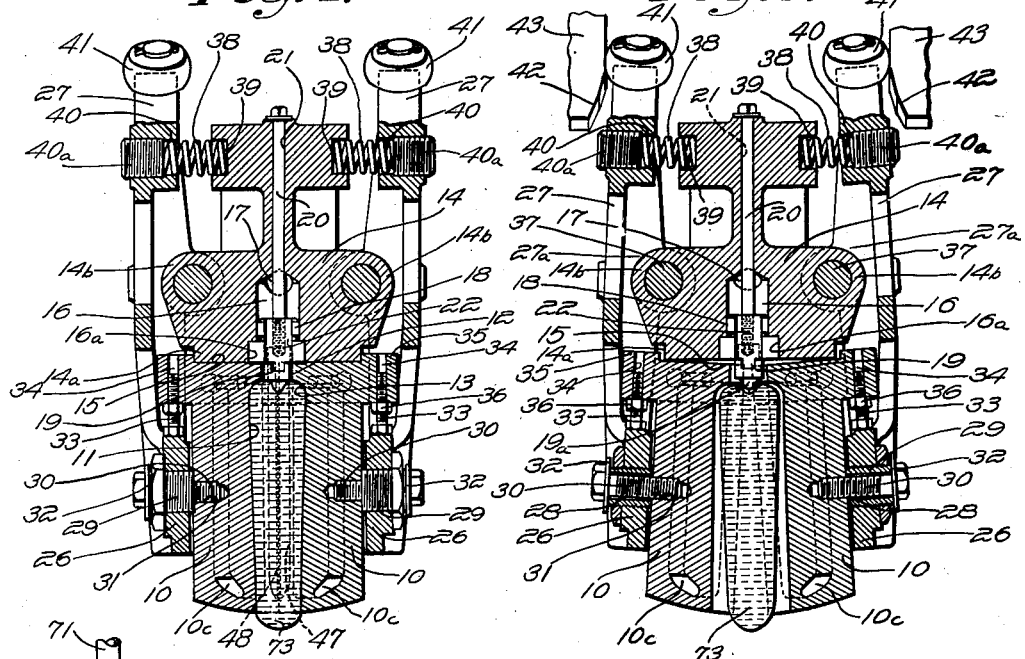
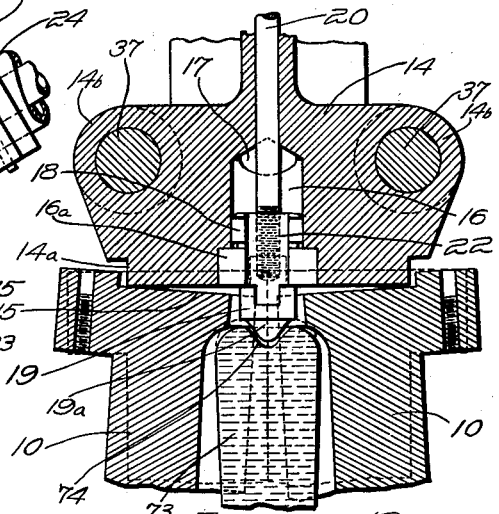
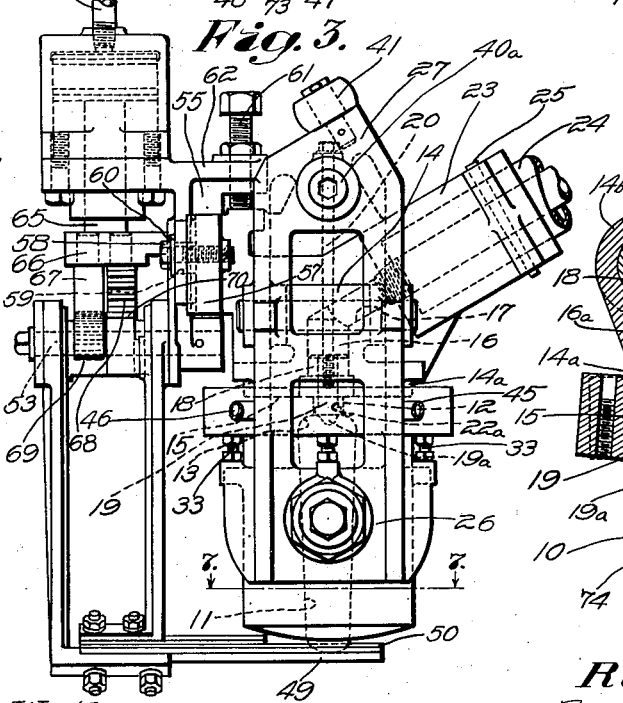
Inventor;
Robert W. Canfield
by Brown + Parham
Attorneys
Witness:
W. B. Thayer Patented Dec. 10, 1940

2,224,759

UNITED STATES PATENT OFFICE 2,224,759

SUCTION CUP GLASS FEEDING MECHANISM AND METHOD

Robert W. Canfield, West Hartford, Conn., assignor to Hartford-Empire Company, Hartford, Conn., a corporation of Delaware Application September 12, 1936, Serial No. 100,408

12 Claims. (Cl. 49—5)

This invention relates to improvements in the art of gathering molten glass charges from the surface of a supply pool in suction cups or receptacles, and for feeding such charges to molds of associate glass forming machines.

A general object of the invention is to provide an efficient, reliable and practical suction feeding mechanism of the type above referred to.

A more specific object of the invention is to provide a suction cup glass feeding mechanism which has improved means for effecting release of the gathered separated glass charges from the walls of the cup cavity, and for effecting downward movement of each charge in such manner as to prevent objectionable tilting or lateral displacement of any portion thereof as it leaves the cavity of the gathering cup.

A further object of the invention is to provide an improved combination of a cooperative suction gathering cup and associate severing means for gathering and feeding to associate molds a series of charges of the same, accurately controlled predetermined weight and shape and for varying, within limits, the weight of the charges to be fed without requiring any change in the size or operation of the gathering cup.

A further object of the invention is the provision of a mechanism of the character described which will afford facilities for feeding to the molds of an associate shaping machine mold charges of suitable shape, size and condition to be fabricated in the shaping molds into bottles or similar articles of glassware having walls free from so-called "counterblow" or "settle blow" waves.

A still further object of the invention is the provision of a mechanism of the character described which embodies as a movable unit a partible suction gathering cup and a vertically adjustable cooperative severing mechanism so associated and arranged as to permit glass to be gathered from a supply body or pool in the gathering cup without subjecting the movable parts of the mechanism for operating the shears to harmful heat or high temperature conditions, and without such severing mechanism interfering with the movements of the suction gathering cup to and from a glass gathering position or with the feeding of the gathered, separated charges to associate glass shaping molds.

Other objects and advantages of the invention will hereinafter be pointed out or will become apparent from the following description of a particular illustrative embodiment of the invention, as shown in the accompanying drawings, in which Figure 1 is a plan view of one form of suction cup glass feeding mechanism of the invention;

Fig. 2 is a front view of such mechanism, showing in full lines the shear blades of the severing mechanism in raised inactive positions before effecting a glass severing operation, and showing in dotted lines such shear blades in other inactive positions after they have been moved downwardly to complete a glass severing operation;

Fig. 3 is a side elevation of the structure shown in the preceding views with the shear blades in inactive positions after a severing operation, as shown by the dotted lines in Fig. 2;

Fig. 4 is a fragmentary vertical section through the partible suction cup and cooperative suction head, showing the means for supporting the cup sections for swinging movements to and from closed positions;

Fig. 5 is a view, similar to Fig. 4, but showing the cup sections open and illustrating the provisions at the upper end of the cup for steadying the gathered glass charge, for forming a central cavity in the upper portion of the charge, and for imparting a straight line downward movement to the charge as the cup sections are opened;

Fig. 6 is a relatively enlarged or detail view of portions of the cup sections and the cooperative suction head, showing in full lines the charge after a cavity has been formed in the upper end thereof, and after it has been given a slight downward impulse by the opening sections of the cup, and showing in dotted lines the position of the upper end of the charge before the sections of the mold cup are opened, and Fig. 7 is a sectional view, substantially along the line 7—7 of Fig. 3, showing the suction and cooling passages in the cup sections, and also illustrating the spacing of the shear blades after they have completed a glass severing operation.

The suction cup in the form now preferred by me comprises a pair of cooperative halves or sections 10. These sections are formed so that a cavity 11, open at its lower end, is defined by them when the sections are closed. This cavity may have a slight downward taper, as shown, but in any case should have a shape conforming to the shape of the major portion of the charge desired.

The cup sections 10 are formed to provide a top for the cup cavity. This top has a central opening 12 of less diameter than the adjacent portion of the cup cavity, the annular surface or shoulder 13 at the upper end of the cup cavity preferably being curved or rounded to avoid any sharp angle or narrow recess at the juncture of the top and side walls of the cup cavity.

A suction head 14 cooperates with the sections of the gathering cup and provides a support from which these sections are pivotally suspended. As shown, the suction head 14 has a slightly reduced lower end portion 14a fitting snugly in and having practically air-tight contact with the bottom of a counterbore or cavity 15 in the top of the gathering cup when the sections of such cup are closed. A suction chamber 16 in the suction head 14 then is disposed directly above and in axial alignment with the central opening 12 in the top of the closed cup. This suction chamber communicates at its upper part with an inclined suction tube 17.

The lower portion of the suction chamber may be enlarged somewhat, as shown at 16a, to accommodate the head of a plug 18 in the lower portion of the suction chamber. A pin or projection 19 depends from the head of the plug 18 through the central opening 12 in the upper part of the closed suction cup, and has a tapering tip 19a depending into the upper part of the cup cavity centrally of the latter. The plug 18 is secured in place by a bolt 20 which extends through a suitable opening or bore 21 in the upper part of the suction head structure and is threaded into a suitable opening in the upper portion of the plug.

Communication between the suction chamber 16 and the cavity of the cup is established through vertical passages or grooves 22 in the plug 18, these passages or grooves extending as indicated at 22a along a portion of the head pin 19. The head pin is of sufficiently small diameter to be spaced from the surrounding wall of the opening 12. With this arrangement, an annular suction space is provided around the lower part of the head pin 19 in open communication with the cavity of the cup and in communication through the passages 22 and 22a with the suction chamber 16. The suction passages and spaces in open communication with the cup cavity are too narrow for glass to be drawn thereinto but are of sufficient area to insure quick and effective reduction of pressure or suction in the cup cavity when suction is on.

The suction tube 17 may extend through an inclined socket or holder 23 which is integrally or rigidly connected with the head 14. This suction tube may pass through a tubular ram or carrier 24 which has its outer end portion received within the socket or holder 23. For detachably securing the ram or carrier 24 to the socket or holder 23, fastening pins 25 may be employed or any other suitable fastening means may be used. Only a portion of the ram or carrier is shown, it being understood that the same may be a part of or connected with any suitable mechanism for supporting and reciprocating the suction head and the parts carried thereby as required for glass gathering and charge delivering operations.

The cup sections 10 are carried by holders 26 which may constitute the lower end portions of intermediately pivoted substantially vertically disposed levers 27. The holders 26 are provided with aligned threaded openings 28 in which are disposed adjustable threaded bushings 29. Cap bolts 30 have their shanks extending loosely through the bushings 29 and are threaded into suitable openings 31 in the wall of the cup sections. Washers 32 are provided between the heads of the cap bolts and the outer ends of the bushings 29. The inner ends of the bushings 29 may space the cup sections slightly from the holders, as shown, to permit circulation of cooling air between the cup sections and the holders.

The play between the shanks of the cap bolts and the bores of the bushings 29 may be such as to permit limited "floating" movements of the sections of the cup relative to their holders to assure self-adjusted cooperative relationships between the cup sections and with the suction head when the cup sections are closed. To maintain the tops of the cup sections level so as to assure proper fit between them and the suction head, adjustable devices in the form of cap bolts 33 may be employed. These cap bolts have their shanks threaded into suitable vertical openings 34 in outwardly extending flanges 35 on the upper portions of the cup sections so that their heads rest upon the holders 26, lock nuts 36 being employed to maintain the devices 33 in their adjusted positions.

The levers 27 are pivoted intermediate their ends to the suction head 14, as by providing such portions of the levers with flanges 27a arranged to straddle opposite outwardly extending side portions 14b of the suction head and being pivotally connected thereto by the horizontal pivot pins 37. It will be observed that these horizontal pivot pins 37 are located above and laterally of the cavity of the cup when the sections of the cup are closed. Thus, as the sections of the cup are swung apart from their closed positions, the portions of such sections at the upper end of the cup cavity move in a path having a downward component, for a purpose to be hereinafter pointed out.

The upper end portions of the levers 27 are urged outwardly from the suction head by coil springs 38. Each of these springs has its inner end seated in a pocket 39 in the adjacent portion of the suction head structure and its outer end received in an opening 40 in the associate lever 27. Threaded plugs 40a close the openings 40 and provide a convenient means for permitting installation of and adjusting the pressure that will be exerted by each of the springs 38.

The upper extremities of the levers 27 carry rollers 41. When the ram or carrier 24 is operated so as to move the suction head and the parts carried thereby outwardly from a glass gathering position over a supply pool of molten glass (not shown), these rollers engage cam surfaces 42 on fixed cam plates 43 which may be carried by stationary frame members 44 (Fig. 1). The action of the cam surfaces of the cam plates 43 on the rollers 41 causes the upper ends of the levers 27 to be swung inward or toward each other, thereby opening the sections of the gathering cup.

The sections of the cup may be cooled, as by providing them with cooling fluid passages 10c (Figs. 4 and 7), through which water or other cooling liquid or fluid may be circulated from inlet pipes 45 to outlet pipes 46 (Fig. 1).

The suction within the cavity of the cup may be rendered effective throughout practically the entire length of such cavity, as by providing registering grooves 47 (Figs. 4 and 7) of substantial area in cross section in the meeting or contacting surfaces of the mold sections, and in communication at their upper ends with the annular space around the head pin 19, and then machining the adjacent surfaces of the sections from these grooves to the inner walls of the sections so as to provide narrow suction slits 48 when the cup sections are closed.

Any suitable known severing or glass-cutting mechanism may be employed to advantage with the glass gathering mechanism of this invention. I prefer, however, to employ a severing mechanism having a pair of cooperative shear blades mounted for movement with the gathering mechanism, and adjustable so as to vary the distance from the cup at which the gathered glass will be separated from the glass of the supply body or pool. By such adjustment of the severing mechanism, the weight of the gathered glass charges can be regulably predetermined. Also, by the use of such an adjustable severing mechanism, the shape of the lower end portion of the gathered glass can be controlled and varied to some extent.

The severing mechanism may comprise a pair of shear blades, respectively designated 49 and 50, carried by arms 51 and 52 which are supported on a horizontal pivot pin 53. The pivot pin 53 is supported by a mounting which is vertically adjustable on the suction head. As shown, the arms 51 and 52 have right-angular outer end portions 51a and 52a respectively, to which the blades 49 and 50 are secured, as by the fastening devices 54. The arrangement is such that the blades are kept horizontal at all times and may be swung from their raised positions, as shown in Fig. 1, and by the full lines in Fig. 2, downwardly across each other beneath the lower end of the suction cup, and then onward (see Figs. 2 and 7) until such blades are disposed far enough apart to permit a gathered glass charge to drop between them. To permit this operation, the arm 51 is longer than the arm 52, the blade 49 on the arm 51 being lowermost when the blades pass each other during a glass severing operation. These blades may be provided with V notches in their cooperative edge portions or may have straight cutting edges. The lowermost blade may be thicker than the upper blade, the latter being relatively thin, or both blades may have cutting edge portions made of metal of the same gauge.

The blades may be curved transversely along arcs of circles having the axis of the pivot pin 53 as a center so as to assure close shearing contact of the blades during glass shearing operations.

The horizontal pin or shaft 53 on which the upper end portions or hubs of the shear arms 51 and 52 are pivotally supported is carried by the lower end portion of a slide block 55 (Fig. 3) which is mounted for vertical adjustment in a slideway 56 (Fig. 1) in a block 57 which is integral with or rigidly secured to the suction head 14 at the side of the latter opposite to the ram or carrier socket 23. Cap bolts 58 pass through vertical slots, one of which is indicated at 59 in Fig. 3, into threaded openings in the block 57, the heads of these bolts serving, when the bolts are tightened, to clamp washers 60 against the slide block and thus to secure the latter against accidental or unintended upward movement relative to the block 57. The vertically adjusted position of the slide block 55 in the slideway 56 is determined by adjustment of a supporting screw 61 which is threaded through a horizontal flange 62 at the upper end of the slide block, and bears at its lower end on the top of the block 57.

A pneumatic mechanism may be employed for operating the shear arms. As shown, a cylinder 63 is carried by a bracket which may be integral with or rigidly connected with the upper portion of the slide block 55. A piston 64 in the cylinder 63 has a stem 65 depending from the cylinder and carrying a head 66. This head 66 carries a pair of depending rack bars 67 and 68 respectively, having teeth which mesh with the teeth of pinions 69 and 70 respectively. The pinions 69 and 70 are integral with or rigidly connected with the hubs of the shear arms 51 and 52.

With this arrangement, when the piston 64 is moved from the lower end of the cylinder 63 to the upper end thereof, the shear arms 51 and 52 will be swung from their raised positions, as shown in Fig. 1 and by the full lines in Fig. 2, downwardly to effect a shearing operation, as the blades 49 and 50 cross each other beneath and in line with the cavity of the suction cup and thence past each other to the dotted line positions shown in Fig. 2. The portions of the blades beneath the lower end of the cup are then spaced sufficiently far apart to permit the charge of glass to drop therebetween. On a return movement of the piston in the cylinder 63, the shear arms will be swung from the dotted line positions of Fig. 2 to the positions shown in Fig. 1 and by the full lines in Fig. 2. For operating the piston in the cylinder 63, pneumatic connections indicated at 71 and 72 may be provided for the upper and lower ends, respectively of the cylinder 63. The introduction and exhaust of pressure fluid to and from the opposite ends of the cylinder through such connections may be timed and controlled by any suitable known mechanism, many examples of which are available to those skilled in the art.

It will be noted that the arrangement above described for supporting the shearing mechanism for movement with the gathering mechanism locates the mechanism for operating the shear blades sufficiently far above the glass contacting portion of the gathering mechanism to be out of the zone of greatest heat. Also, such arrangement locates the mechanism for operating the shear blades out of the path of movement of the suction cup to and from the surface of a glass supply pool, and thus avoids any possibility of contact of the shearing mechanism with fixed walls or structure adjacent to the glass gathering position of the cup as the latter is moved to and from such position.

From the foregoing description of a particular embodiment of the invention, the operation thereof will be readily understood. When the glass gathering cup is moved to a glass gathering position, the sections thereof will be kept closed by the springs 38, the rollers on the levers 27 then being out of contact with the cam plates 43. Suction will be applied through the passages hereinbefore described at the proper time to cause glass from the supply pool to fill the cavity of the cup.

The shears are operated to sever the connecting glass at a predetermined distance below the lower end of the cup cavity, and the cup will be moved by the operating movement of its supporting structure outward toward a station at which the gathered glass is to be discharged from the cup to fall as a charge for delivery to a waiting mold.

The rollers 41 will engage the cam plates 43 to open the cup sections as the cup reaches the charge delivering station. It will be observed that the depending head pin 19 has formed a central cavity in the top of the gathered charge of glass, as indicated at 73 in Figs. 5 and 6. This head pin also serves to steady and keep in a vertical position the charge 73 as the cup sections start to open and simultaneously to impart to the charge an axial downward movement. The operation is shown to advantage in Fig. 6 in which the position of the upper end of the charge before the cup sections start to open is indicated by dotted lines while the position of the dropping charge, as the cup sections open, is indicated by full lines. The ends of the semicircular upper portions of the cup sections will tend to follow the upper end of the charge and to impart a downward movement thereto as the sections 10 are swung apart and move the inner surfaces of the cup sections out of contact with the charge. The charge thus is positively detached from the inner walls of the cup cavity while it is being steadied at its upper end, and is given an axial downward movement so that it will drop vertically downward without tilting from the vertical. This is a decided advantage over the operations of prior partible or sectional cup mechanisms which have been unsuccessful because of inability to deliver the gathered charges axially downward or without being tilted or falling on their sides.

Also, in view of the improved means that the invention provides for disengaging the glass charge from the inner walls of the cup cavity and for causing the detached charge to remain vertical as it is impelled downward, the opening movement of the cup sections may be of but relatively slight extent. Consequently, a further check against harmful lateral tilting or deflecting of the charge is provided in that the inner walls of the cup sections may remain sufficiently close together to have a guiding action on the falling charge, should it be inclined from the vertical or tilted before it passes below the plane of the lower ends of the cup sections.

By releasing the charge in the manner described, and giving it a positive axial downward movement, the chilling contact of the cup walls with the glass will be discontinued over practically the entire surface of the glass charge at the same time, and the charge thus is in the best condition so far as skin formation is concerned for fabrication into an article of glassware in a mold of an associate glassware forming machine. It has been found in actual practice that a charge gathered and delivered by the gathering mechanism of the present invention can be manufactured into a commercially satisfactory article of glassware, such as a bottle, without allowing an unusually long time for reheating, such as heretofore has been believed necessary when the charge has been obtained by gathering glass in a suction cup or receptacle, as distinguished from a charge obtained from a "suspended charge" outlet feeder.

Furthermore, the provision of the cavity in the top of the charge provides an expansion space for preliminary internal expansion of the charge in the first or shaping mold of an associate glassware shaping machine, and thus permits the feeding to such a mold of a charge sufficiently long to extend substantially or nearly the full length of the mold cavity. Also, the charge so formed has a substantially uniform "chilled skin" or "enamel" at its top and side surfaces. Such a charge, therefore, is adapted to be formed into a bottle or similar article of glassware, having walls free from the usual "counterblow" or "settle blow" waves.

If desired, provision may be made in any suitable known way for applying positive or superatmospheric pressure fluid through the suction passages of the suction cup at or immediately before the instant of opening the cup to aid in effecting quick and clean separation of the glass of the charge from the inner surfaces of the cup sections.

The invention is not restricted to the particular structure and mode of operation herein described, but extends to all such structural modifications and adaptations and operations as fairly fall within the scope of the appended claims.

I claim:

1. In combination, an open bottom receptacle comprising a plurality of cooperative sections adapted when closed to gather glass from the surface of a supply body when suction has been produced in said receptacle while it is in glass gathering relation with said supply body, and means for mounting said sections for opening and closing movements, said sections and the means for mounting them being so constructed and arranged that the opening of the sections will release the gathered glass therein and cause a downward movement of a portion of at least one of said sections in contact with the upper surface of the gathered glass so as to impart a downward axial movement thereto.

2. In combination, an open bottomed receptacle comprising a plurality of cooperative sections adapted when closed to gather glass from the surface of a supply body when suction has been produced in said receptacle while it is in glass gathering relation with said supply body, means for mounting said sections for opening and closing movements, said sections and the means for mounting them being so constructed and arranged that the opening of the sections will release the gathered glass therein and cause a downward movement of the upper portions of said sections in contact with the upper surface of the gathered glass so as to impart a downward axial movement thereto, and means for steadying the gathered glass in the receptacle to maintain such glass vertical as the sections are opened.

3. In combination, an open bottomed receptacle comprising a plurality of cooperative sections adapted when closed to gather glass from the surface of a supply body when suction has been produced in said receptacle while it is in glass gathering relation with said supply body, means for mounting said sections for opening and closing movements, said sections and the means for mounting them being so constructed and arranged that the opening of the sections will release the gathered glass therein and impart a downward axial movement thereto, and a member depending into the cavity of the closed receptacle centrally thereof for forming a central cavity in the upper end portion of the gathered glass charge and for steadying the glass charge as the sections of the receptacle are opened.

4. Glass feeding mechanism comprising a suction head, an open-bottom cup comprising a pair of cooperative partible longitudinal sections formed to provide, when closed, a central opening at the top of the cavity of the cup, means for pivotally supporting said cup sections so that said sections, when closed will be located in substantially air tight contact with said suction head at all points immediately surrounding said central opening, said cup sections and said means for pivotally supporting them being so constructed and arranged as to cause the cup sections to apply a positive downward impulse to a charge of glass in the cup as the sections are swung from closed positions toward their open positions, a pin depending through said central opening in spaced relation with the walls thereof and into the cavity of said cup, and a shearing mechanism comprising a pair of cooperative blades operable to shear glass in the cup cavity from an underneath supply at a predetermined variable distance below the lower end of said cavity.

5. Glass feeding mechanism comprising an open bottomed suction glass gathering receptacle, means for supporting said receptacle for movement to and from a glass gathering position at the surface of a supply pool of glass, and a severing mechanism mounted on said supporting means for movement with said cup and for vertical adjustment relative to said cup, said severing mechanism comprising a cylinder located above the level of said cup, a piston reciprocable in said cylinder, a pair of cooperative shear blades, and connections between said blades and said piston for swinging said blades from raised out-of-the-way positions above the level of the cup to positions to effect shearing of glass in the cup from the underneath supply pool at a predetermined variable distance below the lower end of the cup.

6. Glass feeding mechanism comprising a suction head, an open bottomed cup comprising a pair of partible cooperative longitudinal sections having inwardly extending top portions adapted to define a central opening at the top of the cavity of the cup when the sections are closed, substantially vertical levers having their lower end portions connected with and supporting said cup sections and having their intermediate portions pivotally connected with said suction head for swinging movements about horizontal axes respectively located at opposite sides of said suction head and of the vertical plane at which the partible longitudinal sections meet when the sections are closed, yieldable means urging the upper ends of said levers apart to maintain said cup sections closed beneath and in working relationship with said suction head, means for moving said suction head and said cup sections as a unit between a glass gathering position and a glass feeding position, and cam means operable when said suction head and closed cup sections have been moved from said glass gathering position to said glass feeding position for actuating said levers to swing said cup sections apart with movements having a downward component to release the gathered glass from the cavity of the cup and to impart a downward movement thereto.

7. Glass feeding mechanism comprising a suction head, an open bottomed cup comprising a pair of partible cooperative longitudinal sections having inwardly extending top portions adapted to define a central opening at the top of the cavity of the cup when the sections are closed, substantially vertical levers having their lower end portions connected with and supporting said cup sections and having their intermediate portions pivotally connected with said suction head for swinging movements about horizontal axes respectively located at opposite sides of said suction head and of the vertical plane at which the partible longitudinal sections meet when the sections are closed, yieldable means urging the upper ends of said levers apart to maintain said cup sections closed beneath and in working relationship with said suction head, means for moving said suction head and said cup sections as a unit between a glass gathering position and a glass feeding position, and cam means operable when said suction head and closed cup sections have been moved from said glass gathering position to said glass feeding position for actuating said levers to swing said cup sections apart with movements having a downward component to release the gathered glass from the cavity of the cup and to impart a downward movement thereto, said cam means being of such character as to limit the opening movements of the cup sections so that the opened sections will serve as guides for preventing substantial lateral deflecting or tilting of the gathered glass during the descent thereof between said sections.

8. Glass feeding mechanism comprising a suction head, a cup comprising a pair of longitudinal sections having inwardly extending top portions adapted to define a central opening at the top of the cavity of the cup when the sections are closed, means including separate horizontal pivot pins carried by the head at places located laterally of and above the inwardly extending top portions of the cup sections for pivotally supporting said sections for movements to and from closed positions beneath the suction head and so that the inwardly extending portions of said sections move in directions having a downward component during the opening of said sections, and a pin depending from said suction head through said central opening in spaced relation with the walls thereof and into the cavity of the cup when said sections are closed.

9. Glass feeding mechanism comprising a suction head, a cup comprising a pair of longitudinal sections having inwardly extending top portions adapted to define a central opening at the top of the cavity of the cup when the sections are closed, means including separate horizontal pivot pins carried by the head at places located laterally of and above the inwardly extending top portions of the cup sections for pivotally supporting said sections for movements to and from closed positions beneath the suction head and so that the inwardly extending portions of said sections move in directions having a downward component during the opening of said sections, a pin depending from said suction head through said central opening in spaced relation with the walls thereof and into the cavity of the cup when said sections are closed, and a shearing mechanism carried by said head and so constructed and arranged as to comprise blades movable from raised positions above said cup downwardly beneath the bottom of the cup to effect a shearing operation and thence past each other to positions spaced sufficiently far apart to permit gathered glass to fall from said cup cavity between said blades.

10. The method of feeding charges of molten glass which comprises gathering glass by suction from the surface of a supply pool into a receptacle having an inner contour suitable to give to the gathered glass charge a shape appropriate for the mold for which the charge is intended, and detaching the glass charge from the inner surfaces of the receptacle and simultaneously imparting a downward impulse to such charge by the contact of a solid member with an upper surface of the charge.

11. The method of feeding charges of molten glass which comprises gathering glass by suction from the surface of a supply pool into a receptacle having an inner contour suitable to give to the gathered glass charge a shape appropriate for the mold to be charged, severing the gathered glass from the supply pool at a predetermined variable distance below the lower end of the receptacle, forming a central cavity in the upper end portion of the gathered glass charge to accommodate a longitudinally displaced portion of the glass charge when such charge is subsequently expanded in the mold, and releasing said charge from the gathering receptacle and simultaneously applying a downward impulse thereto by the contact of a solid member with an upper surface of such charge so that the charge will fall axially downward for delivery to said mold.

12. Glass feeding mechanism comprising a movable support, an open bottomed glass gathering suction cup carried by the support and a shearing mechanism also carried by said support and so constructed and arranged as to comprise blades movable from opened positions at opposite sides of the cup toward each other beneath the bottom of the cup to effect a shearing operation and thence past each other to positions spaced sufficiently far apart to permit a charge of glass that has been gathered in the cup to fall therefrom through the space between said blades.

ROBERT W. CANFIELD.